Aug. 4, 1959   L. F. BENDER   2,897,828
DAIRY EQUIPMENT
Filed Aug. 9, 1956   2 Sheets-Sheet 1
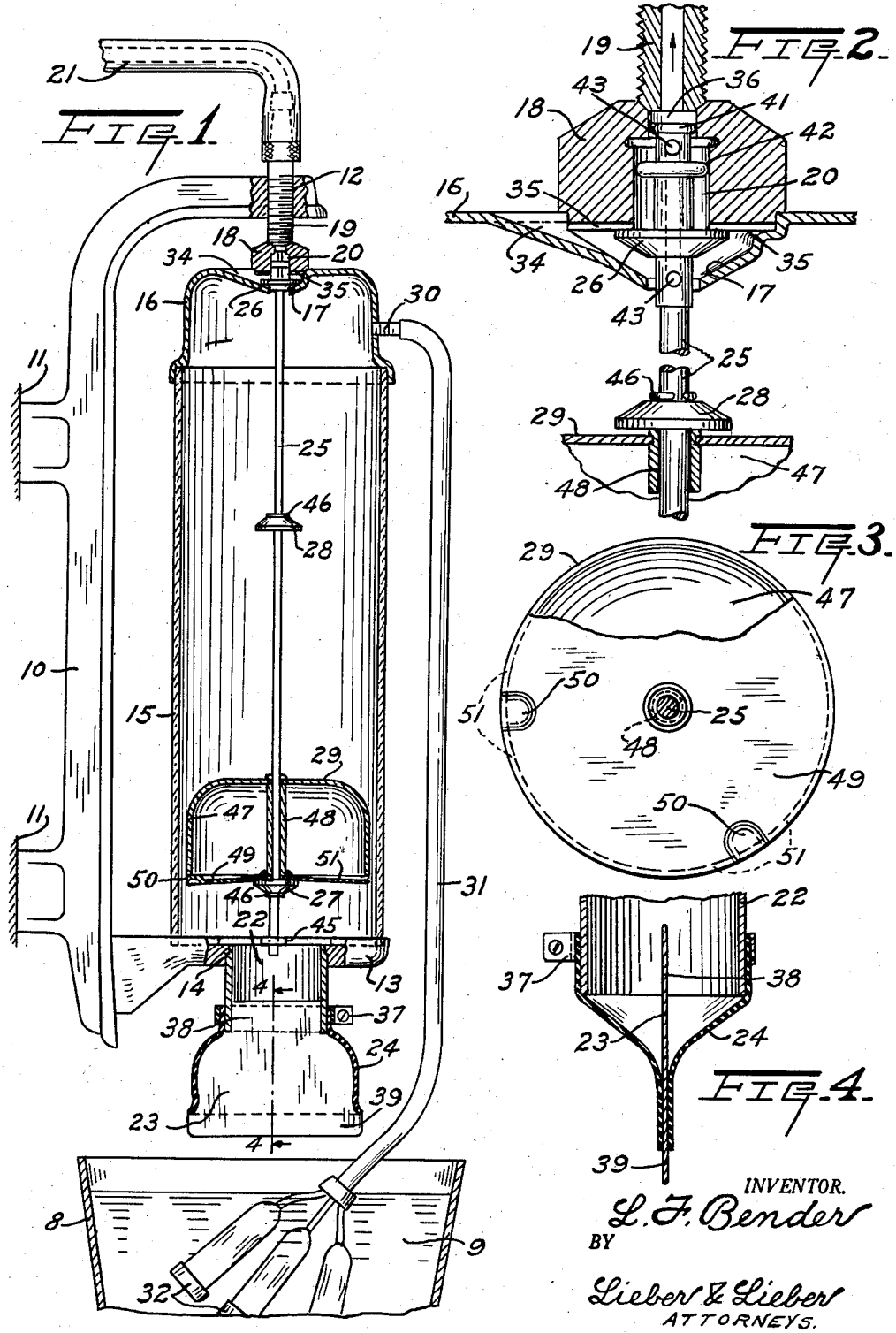
INVENTOR.
L. F. Bender
BY
Lieber & Lieber
ATTORNEYS.

Aug. 4, 1959  L. F. BENDER  2,897,828
DAIRY EQUIPMENT
Filed Aug. 9, 1956  2 Sheets-Sheet 2
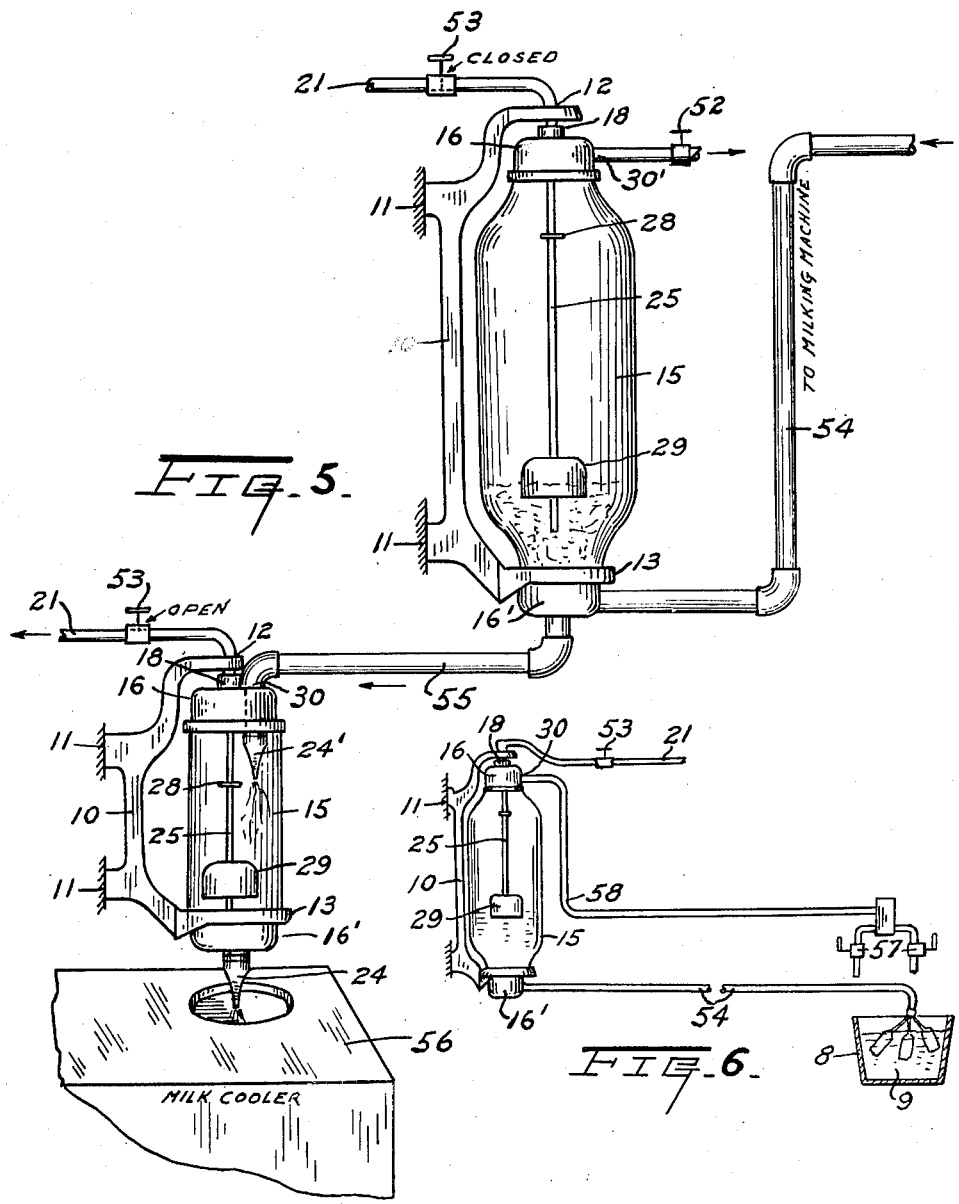
INVENTOR.
L. F. Bender
BY
Lieber & Lieber
ATTORNEYS.

ary equipment washers and a system for interchangeably utilizing same removed from page 1.

United States Patent Office 2,897,828
Patented Aug. 4, 1959

2,897,828

DAIRY EQUIPMENT

Lloyd F. Bender, Hayward, Wis.

Application August 9, 1956, Serial No. 603,021

6 Claims. (Cl. 134—56)

This invention relates generally to improvements in the art of producing and utilizing dairy equipment, and relates more specifically to improvements in the construction and operation of mechanism for cleaning various parts of milking machines and to an improved system for interchangeably using such mechanisms to transport milk from milk extracting machines to a milk storage cooler or the like..

The primary objects of the present invention is to provide various improvements in dairy equipment whereby the efficiency and utility of such apparatus is enhanced to a maximum.

Some of the more important specific objects of the invention are as follows:

To provide improvements in dairy equipment cleaners of the type forming the subject of my U.S. Patent No. 2,829,657, granted April 8, 1958.

To provide an improved milking machine parts washer of the float controlled type which is more effective and silent in action than the previous units.

To provide an improved milk line pre-rinse system for milking machine installations.

To provide an improved quick acting vacuum control valve assemblage for dairy equipment washers of the float actuated type.

To provide an improved more efficient float structure for milking machine parts cleansers of the float actuated type.

To provide an improved and simplified discharge valve structure for milking machine teat cup and pipe line washers and sterilizers of the pulsating type.

To provide an improved system for interchangeably utilizing float actuated milking machine parts washers, to conduct fresh milk from the supply source to a cooler or the like, during normal operation of the extraction machine.

To provide an improved mode of alternately normally transporting milk through a pipe line and of cleansing the same line by causing washing liquid to flow back and forth therethrough when the milk supply is interrupted.

These and other more specific objects and advantages of the invention will be apparent from the following detailed description.

A clear conception of the several features constituting the present improvements, and of the construction and operation of typical commercial dairy equipment embodying the invention, may be had by referring to the drawings accompanying and forming a part of this specification in which like reference characters designate the same or similar parts in the various views.

Fig. 1 is a relatively diagrammatic central vertical section through one of the improved dairy equipment washers, showing the liquid actuated float in lowermost position and the vacuum control valve closed relative to the ambient atmosphere;

Fig. 2 is a considerably enlarged fragmentary central vertical section through the vacuum control valve of the same washer and through a portion of the float, showing the vacuum valve open to the ambient atmosphere and the float in uppermost position;

Fig. 3 is a somewhat enlarged bottom view of the improved float structure of the same unit, a portion of the lower liquid trapping and release plate having been broken away;

Fig. 4 is a likewise enlarged central vertical section through the improved liquid discharge valve of the same cleanser, taken along the line 4—4 of Fig. 1;

Fig. 5 is a somewhat diagrammatic side elevation of a system for interchangeably utilizing several of the improved washing units to transport fresh milk from a milking machine to a milk cooler, the parts being shown in milk conveying position; and Fig. 6 is another diagram showing an installation for effecting pre-rinsing of the milk transporting line.

While the invention has been illustrated and described as having been embodied in cleansing units having the actuating floats movable within stationary casings provided with transparent medial sections, it is not intended to limit the use of the improved features to such assemblages; and it is also contemplated that specific descriptive terms be given the broadest possible interpretation consistent with the actual disclosure.

Referring especially to Figs. 1 to 4 inclusive of the drawings, the improved milking machine parts washer illustrated therein, comprises in general, a reservoir 8 or other source of sterilizing and cleansing liquid 9; a bracket 10 adapted to be firmly attached to a stationary support 11, and having a screw threaded opening 12 at its upper end and a shelf 13 at its lower end provided with another opening 14 which is vertically alined with the opening 12; a liquid receptacle consisting of an upright transparent tubular lower section 15 snugly seated upon the shelf 13 and also having an upper cap 16 seated upon the section 15 and provided with a central valve seat 17; a centrally bored clamping block 18 coacting with the cap 16 above the seat 17 and being clampingly engaged by a tubular externally threaded bushing 19 connecting the bore 20 of the block 18 with a source of vacuum through a duct 21; a liquid discharge valve having rigid suspension tube 22 connected to the shelf 13 at the opening 14 and provided at its lower end with a center plate 23 and with an elastic sleeve 24 embracing the tube end and spanning the opposite sides of the plate 23; an elongated rod 25 provided near its upper end with a disk valve 26 which is alternately cooperable with the seat 17 and with the block bore 20, while the lower rod portion is provided with vertically spaced lower and upper abutments 27, 28 respectively; an inverted cup-shaped float 29 freely movable along the rod 25 between the abutments 27, 28; and a liquid inlet 30 communicating with the interior of the cap 16 and adapted to receive the upper end of a flexible conduit 31 from the lower end of which milking machine teat cups 32 may be suspended while immersed within the liquid 9 in the reservoir 8.

The reservoir 8 should contain an abundance of the cleansing liquid 9 which should be frequently replaced so as to maintain sanitary conditions; and the main frame or bracket 10 and the shelf 13 are constructed of durable metal, while the mounting support 11 may be a wall, post or any other available structure. The tubular lower section 15 of the vertically elongated liquid receptacle which is fixedly mounted upon the frame and shelf 13 is sealed at its ends and may be formed of glass or the like; while the closure cap 16 may be constructed of corrosion resistant sheets metal and is provided with one or more recesses 34 radiating from the valve seat 17 and adapted to connect the interior of the cap 16 with the ambient atmosphere through the central seat opening whenever the valve 26 is lifted away from the seat 17. The clamping block 18 which is engaged by the threaded bushing 19 coacting with the threaded opening 12 to clamp the cap 16 against the tubular section 15 and the latter against the shelf 13, has several lower grooves 35 therein which constantly connect the lower end of the bore 20 with the ambient atmosphere, and the upper end of the bore 20 communicates with a smaller bore 36 which is in open communication with and is exposed to vacuum through the duct 21 when this duct is open, see Figs. 1 and 2.

The liquid discharge valve at the lower end of the vertically elongated liquid receptacle is of improved and simplified construction. The suspension tube 22 is preferably formed of a short section of stainless steel tube stock, while the flat center plate 23 may be die cut from fibre stock or sheet metal, and the elastic sleeve 24 is merely a section of thin rubber tubing which is stretched over the plate 23 and is clamped to the lower end of the tube 22 by an adjustable clamp 37, as illustrated in Figs. 1 and 4. The plate 23 has its upper extremity 38 snugly fitted diametrically across the interior of the rigid tube 22, while its lower end portion 39 is of considerably greater length than the extremity 38, and the lower part of the flexible sleeve 24 normally lies flat against the opposite sides of the mid-section of the plate 23 but will expand away from these plate sides whenever the head of liquid within the tube 22 reaches a predetermined value. The delivery of liquid through this discharge valve is therefore automatic depending upon the internal liquid pressure applied to the flexible sleeve 24 and the upper end of this sleeve should be sealingly clamped to the tube 22 at all times.

The elongated upright rod 25 which has the disk valve 26 secured thereto near its upper end, is also provided with an upper plunger 41 snugly slidable within the smaller upper bore 36 of the block 18, with a lower larger plunger 42 loosely fitting and slidable along the larger lower bore 20, and with an internal passage 43 connecting the interior of the receptacle cap 16 with the space between the plungers 41, 42, see Fig. 2. When the disk valve 26 is lowered into engagement with the seat 17, the upper plunger 41 will drop out of the small bore 36 and will place the interior of the cap 16 into unobstructed open communication with the vacuum line 21 through the passage 43 and nipple 19, thus exposing the upper face of the larger plunger 42 to vacuum and its lower face to ambient air pressure. However, when the disk valve 26 is raised into contact with the bottom of the clamping block 18 as in Fig. 2, then the upper plunger 41 enters the bore 36 and shuts off communication between the passage 43 and the vacuum source, while simultaneously exposing the upper face of the larger plunger 42 to atmospheric pressure through the passage 43 and the lower face of this plunger 42 to like pressure through the restricted grooves 35.

The lower end of the elongated rod 25 may be guided for reciprocation in a guide member 45 secured to the shelf 13, and the lower and upper abutments 27, 28 may be adjustably secured to the medial portion of the rod 25 by friction rings 46, or otherwise. The float 29 which is freely slidable along the rod 25 between the two abutments 27, 28 is also of improved construction and comprises an inverted sheet metal cup 47 secured centrally to the upper end of a guiding sleeve 48, and a bottom disk 49 likewise secured to the lower end of the sleeve 48 and having the major portion 51 of its periphery spaced slightly from the cup brim by means of several radial lugs 50 formed on the disk 49. The elongated peripheral openings 51 connect the interior of the float 29 with the interior of the receptacle section 15, and when this float 29 is subjected to rising liquid within its confining receptacle, some of the liquid will enter the float interior and become trapped within the float while the latter is moving upward; but when the liquid level drops and the float 29 descends, the entrapped liquid will gradually escape through the openings 51 and will assist the weight of the float in positively and rapidly closing the disk valve 26 against the seat 17.

The improved devices may be furnished in several sizes, and depending upon the use to which the unit is to be applied, the liquid inlet 30 may be connected to the cap 16 either horizontally as in Figs. 1 and 6, or vertically as in the lower unit of Fig. 5, while the lower portions of the liquid confining receptacles 15 may also be provided with a lower closure cap 16' as depicted in Figs. 5 and 6. The vacuum line 21 of each unit should also be provided with a shut-off valve 53 as in Figs. 5 and 6, and the vacuum connection 30' of the upper unit should be provided with a shut-off valve 52 and may be connected to the pulsator of a standard milking machine, while the lower cap of this unit is connected to the milk transporting pipe line 54, and to the inlet 30 of the lower unit by a connection 55 when several units are utilized to convey fresh milk from the source to a cooler 56. In the system shown in Fig. 5, the inlet 30 to the lower smaller unit has also been provided with a discharge valve assemblage such as shown in Fig. 4, while in Fig. 6 this inlet 30 is connected to a source 57 of rinsing water through a pipe 58, and in order to provide a clear conception of the utility of the invention, its several uses will be separately described.

Referring to Fig. 1, when a unit has been assembled and installed as illustrated therein, and the reservoir 8 has been provided with an abundance of cleansing liquid 9 having a group of teat cups 32 immersed therein, it is only necessary to connect the line 21 with a source of vacuum whereupon the device will function automatically as follows. The float 29 while resting upon the lower abutment 27 will hold the disk valve 26 against the seat 17 thereby permitting the air to be withdrawn from within the receptacle 15 through the passage 43, bore 36, nipple 19 and line 21, and causing liquid 9 to be drawn through the cups 32, connection 31 and inlet 30, and subsequently deposited within the upright receptacle 15. The lower discharge valve will remain closed by the ambient air pressure and as the liquid rises it elevates the float 29 along the rod 25 until this float engages the upper abutment 28 whereupon the disk valve 26 is unseated and is lifted into engagement with the block 18 while the upper plunger 41 simultaneously enters the small upper bore 36 in this block and cuts off the vacuum source.

When the parts are thus displaced, atmospheric air enters the receptacle 15 through the valve seat 17 and also enters the space within the larger bore 20 between the plungers 41, 42 through the passage 43. The weight of the confined liquid subjected to air pressure then causes the flexible discharge valve tube 24 to spread away from the central plate 23, thereby opening this valve and permitting the liquid to quickly escape and drop into the reservoir 8 and also causing liquid confined within the tube 31 to surge back into this reservoir through the submerged teat cups 32, thus subjecting both the interiors and exteriors of the milking machine cups 32 to thorough reverse flow cleansing action. The lowering of the liquid level within the receptacle 15 also causes the float 29 to descend along the rod 25 until it again engages the lower abutment 27 and returns the disk valve 26 into engagement with the seat 17 and also withdraws the plunger 41 from the bore 36. This cycle of operations may be automatically repeated as long as the vacuum is applied and until the parts 31, 32 have been sufficiently washed and sterilized.

The same type of unit may also be utilized to convey fresh milk from the milking machine through its transporting line 54 to a cooler 56 or the like, and to interchangeably cleanse and sterilize the milk conveying line 54. Such a convertible system is illustrated in Fig. 5, wherein the upper larger unit is used primarily as a receiving chamber for the fresh milk when the apparatus is employed to transport fresh milk through the pipe line 54 to the cooler 56, whereas the smaller lower unit actually produces the flow of fresh milk. When thus utilized for milk transporting purposes, the vacuum control valve 53 of the upper unit should be closed while its valve 52 should be open to connect the upper receptacle 15 with the milking machine vacuum source, and the valve 53 of the lower unit should be open. This will cause the upper receptacle 15 to act as an accumulator for fresh milk and cause it to collect sufficient milk so that the lower smaller unit will function properly, but the upper receptacle 15 will not fill up completely because the lower unit is constantly removing successive batches of the milk through the connection 55 and the upper discharge valve 24'. Whenever the lower receptacle 15 fills and raises the float 29 therein sufficiently to open its disk valve 26, air will be admitted to the lower receptacle and the vacuum is shut off, thus causing the upper discharge valve 24' to close and the lower valve 24 to open and depositing a batch of milk into the cooler. This delivery of successive batches of fresh milk will continue automatically as long as the upper control valve 53 remains closed, and the valve 52 and the lower valve 53 are open.

In order to utilize the same system to cleanse the milk conveying pipe line 54 and other milking machine parts, when the milking machine is idle, the teat cups 32 and other parts at the milking machine end of the line 54 should be immersed in a reservoir 8 having cleansing liquid 9 therein, and the upper vacuum control valve 53 should be opened while the vacuum valve 52 and the lower valve 53 should be closed. The cooler 56 should also be replaced by a cleansing liquid reservoir 8 adapted to receive a small portion of the cleansing liquid delivered by the lower unit, whereupon the upper unit will function as described in connection with Fig. 1, to cause the major portion of the cleansing solution 9 to surge back and forth through the line 54 and through the milking machine parts connected thereto and which are immersed in the solution. This cleansing action may be continued until all of the immersed parts and the pipe line 54 have been thoroughly washed and sterilized whereupon the milking machine is ready for subsequent normal operation.

In order to utilize the same type of washing unit in a pre-rinse system for the fresh milk transporting line 54 and milking machine parts connected to this line, an assemblage of elements such as shown in Fig. 6 may be employed. Here the washing unit has been provided with a lower cap 16' connected to one end of the milk line 54 the opposite end of which is connected to milking machine parts immersed in liquid 9 within a reservoir 8, while the upper cap 16 of the receptacle has its inlet 30 connected to one end of a rinsing liquid supply pipe 58 the opposite end of which is connected to a source 57 of hot and cold water having a mixing valve therein. By opening the vacuum control valve 53 of this system and by adjusting the valves at the source 57 so as to provide a supply of rinsing liquid at the desired temperature, this system will function to alternately pulsate rinsing liquid through the milk line 54 and the milking machine parts connected thereto, and the final cleansing and sterilization may thereafter be effected as hereinabove described.

From the foregoing detailed description of the construction and operation of the improved dairy equipment, it should be apparent that the present invention in fact provides an improved unit which is simple, compact and highly effective in use, and which is also flexible in its adaptation to either rinse or wash milking machine parts, or to act as a means for merely transporting the fresh milk from the milking machines to a cooler or the like. While it has heretofore been proposed to utilize milking machine equipment to convey the fresh milk to a receptacle and to wash the milk transporting line when the milking machine is inactive, these prior attempts have failed because they caused the cleansing liquid to flow in only one direction through the line and did not surge this liquid back and forth so as to produce thorough washing and sterilizing. The present improved float actuated valve assemblage is also far more positive and effective in action than that disclosed in my prior application above referred to, and the improved float and discharge valve structures have also vastly increased the effectiveness of these elements while reducing the cost of construction to a minimum. The several improvements have gone into highly satisfactory and successful commercial use, and can obviously be applied to units of various sizes and capacities.

It should be understood that it is not desired to limit this invention to the exact details of construction and operation of the washing units herein shown and described, for various modifications within the scope of the appended claims may occur to persons skilled in the art.

I claim:

1. In a milking machine parts washer, a receptacle having an inlet port for cleansing liquid, a closure for the upper portion of said receptacle having a valve seat thereon, a member above and spaced from said seat and having coaxial superimposed large and small bores therein, an upright reciprocable rod mounted within said receptacle and having thereon a valve cooperable with said seat and with said member to alternately connect the interior of said receptacle with a source of vacuum and with the ambient atmosphere, said rod having superimposed large and small plungers thereon slidable along and cooperable with said bores respectively and also having a passage constantly connecting the interior of said receptacle with the space between said plungers, a float operable by the liquid within said receptacle to reciprocate said rod, and liquid discharge means at the lower portion of said receptacle.

2. In a milking machine parts washer, a tubular upright receptacle having an inlet port for cleansing liquid, a closure for the upper end of said receptacle having a valve seat thereon, a clamping member for said closure having a large bore above and spaced from said seat and a small bore connected to the upper end of said large bore, an upright longitudinally reciprocable rod having thereon a valve cooperable with said seat and also having thereon large and small plungers slidably cooperable with said bores respectively to alternately connect the receptacle interior with a source of vacuum and with the ambient atmosphere, said rod also having a passage therein which constantly connects the receptacle interior with said large bore between said plungers, a float operable by the liquid within said receptacle to reciprocate said rod, and liquid discharge means at the lower end of said receptacle.

3. In a milking machine parts washer, a receptacle for cleansing liquid, a closure for the upper portion of said receptacle having a valve seat thereon, a member above and spaced from said seat and having coaxial superimposed large and small bores therein, an upright reciprocable rod mounted within said receptacle and having thereon a valve cooperable with said seat and with said member to alternately connect the interior of said receptacle with a source of vacuum and with the ambient atmosphere, said rod having superimposed large and small plungers thereon slidable along and cooperable with said bores respectively and also having a passage constantly connecting the interior of said receptacle with the space between said plungers, a float operable by the liquid within said receptacle to reciprocate said rod, and liquid inlet and discharge means at the lower portion of said receptacle.

4. In a milking machine parts washer, a tubular upright receptacle for cleansing liquid, a closure for the upper end of said receptacle having a valve seat thereon, a clamping member for said closure having a large bore above and spaced from said seat and a small bore connected to the upper end of said large bore, an upright longitudinally reciprocable rod having thereon a valve cooperable with said seat and also having thereon large and small plungers slidably cooperable with said bores respectively to alternately connect the receptacle interior with a source of vacuum and with the ambient atmosphere, said rod also having a passage therein which constantly connects the receptacle interior with said large bore between said plungers, a float operable by the liquid within said receptacle to reciprocate said rod, and liquid inlet and discharge means at the lower end of said receptacle.

5. In a milking machine parts washer, a receptacle having an inlet port for cleansing liquid, a closure for the upper portion of said receptacle having a valve seat thereon, a member above and spaced from said seat and having coaxial superimposed large and small bores therein, an upright reciprocable rod mounted within said receptacle and having thereon a valve cooperable with said seat and with said member to alternately connect the interior of said receptacle with a source of vacuum and with the ambient atmosphere, said rod having superimposed large and small plungers thereon slidable along and cooperable with said bores respectively, conduit means constantly connecting the interior of said receptacle with the space between said plungers, a float operable by the liquid within said receptacle to reciprocate said rod, and liquid discharge means at the lower portion of said receptacle.

6. In a milking machine parts washer, a tubular upright receptacle for cleansing liquid, a closure for the upper end of said receptacle having a valve seat thereon, a clamping member for said closure having a large bore above and spaced from said seat and a small bore connected to the upper end of sid large bore, an upright longitudinally reciprocable rod having thereon a valve cooperable with said seat and also having thereon large and small plungers slidably cooperable wtih said bores respectively to alternately connect the receptacle interior with a source of vacuum and with the ambient atmosphere, conduit means constantly connecting the receptacle interior with said large bore between said plungers, a float operable by the liquid within said receptacle to reciprocate said rod, and liquid inlet and discharge means at the lower end of said receptacle.

References Cited in the file of this patent
UNITED STATES PATENTS

| | | |
|---|---|---|
| 1,645,356 | Shurts | Oct. 11, 1927 |
| 1,926,018 | Armstrong | Sept. 12, 1933 |
| 2,594,525 | Walden | Apr. 29, 1952 |
| 2,595,539 | Redman | May 6, 1952 |
| 2,685,884 | Heckendorf | Aug. 10, 1954 |
| 2,703,086 | Hodsdon | Mar. 1, 1955 |
| 2,717,576 | Hansen | Sept. 13, 1955 |
| 2,725,883 | Ward | Dec. 6, 1955 |
| 2,733,667 | Hill | Feb. 7, 1956 |